April 21, 1953      E. A. COOK      2,635,891

TRAILER HITCH

Filed Dec. 29, 1950      2 SHEETS—SHEET 1

INVENTOR.
ERNEST A. COOK,
BY
McMorrow, Berman & Davidson
ATTORNEYS.

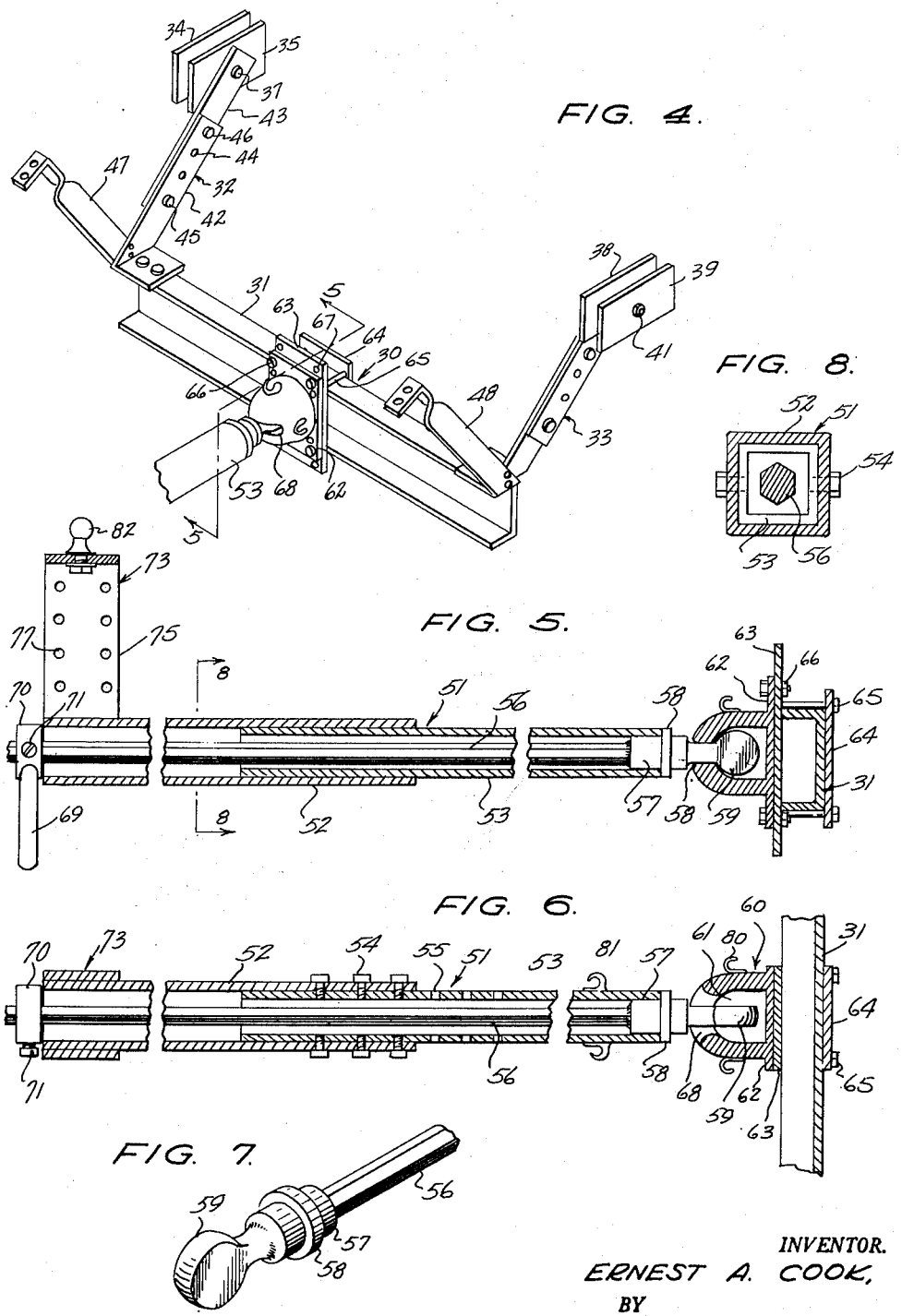

Patented Apr. 21, 1953

2,635,891

UNITED STATES PATENT OFFICE 2,635,891

TRAILER HITCH

Ernest A. Cook, Ocala, Fla.

Application December 29, 1950, Serial No. 203,411

2 Claims. (Cl. 280—33.44)

This invention relates to coupling devices, and more particularly to a hitch for attaching a trailer to an automotive vehicle.

An object of this invention is to provide a trailer hitch for attachment to an automotive vehicle which is particularly adapted to place the weight of the trailer on the rear springs of the vehicle instead of the bumper thereof.

Another object of this invention is to provide a trailer hitch for attachment to an automotive vehicle which is particularly adapted to place the rearwardly directed pull exerted on the vehicle due to the weight of the trailer as the vehicle moves forwardly on the vehicle chassis.

A further object of this invention is to provide a trailer hitch which facilitates a more effective coupling between the trailer and the vehicle, whereby the assembly travels as a unit with substantially less side sway of the trailer with respect to the vehicle.

A still further object of this invention is to provide a trailer hitch which is particularly adapted for attaching and detaching a trailer to and from an automotive vehicle without requiring the user to get beneath the vehicle.

A still further object of this invention is to provide a trailer hitch which is particularly adapted for adjustably securing a trailer to an automotive vehicle with the trailer in a desired level position.

A still further object of this invention is to provide a trailer hitch which is adapted for attachment to any vehicle without marring the vehicle finish and requiring a visible modification of the vehicle.

A still further object of this invention is to provide a trailer hitch for attachment to an automotive vehicle which is relatively simple in structure and cheap to manufacture.

The above and still further objects and advantages of the present invention will become apparent upon consideration of the following detailed description of the invention, when taken in conjunction with the accompanying drawings, wherein:

Figure 4 is an enlarged perspective view of a portion of the trailer hitch of the present invention which is adapted to be secured to the vehicle chassis;

Figure 5 is an enlarged sectional view, with parts broken away, taken along the line 5—5 of Figure 4;

Figure 6 is an enlarged sectional view, with parts broken away, taken along the line 6—6 of Figure 2;

Figure 7 is an enlarged fragmentary perspective view of the hitch head forming a part of the trailer hitch of the present invention; and Figure 8 is an enlarged sectional view taken along the line 8—8 of Figure 5.

Figure 1:
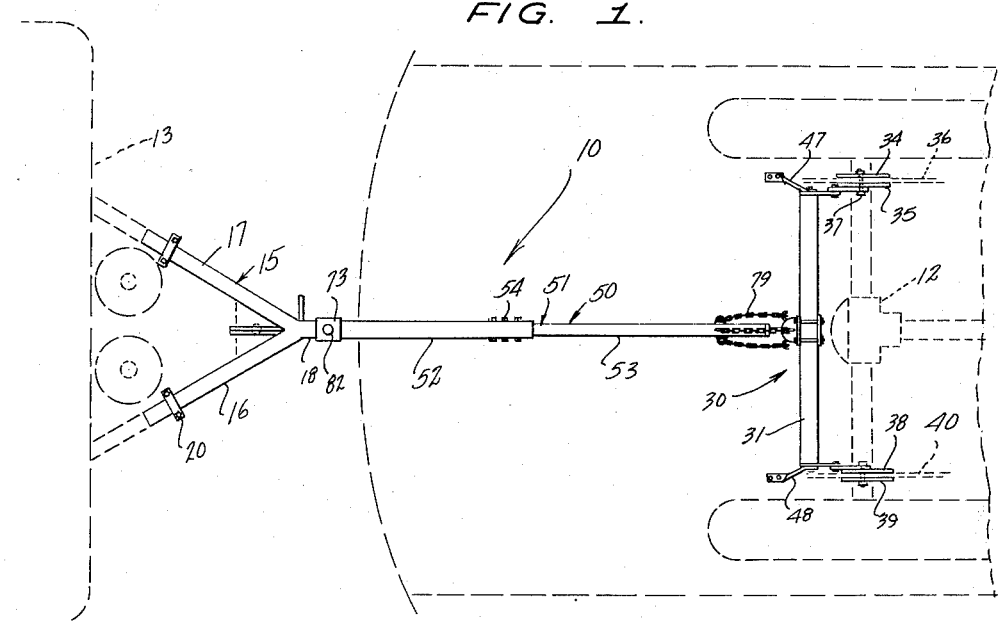
Figure 1 is a top plan view of the trailer hitch of the present invention, shown connected to an automotive vehicle and to a trailer body, the vehicle and trailer body being illustrated in phantom.
Figure 2:
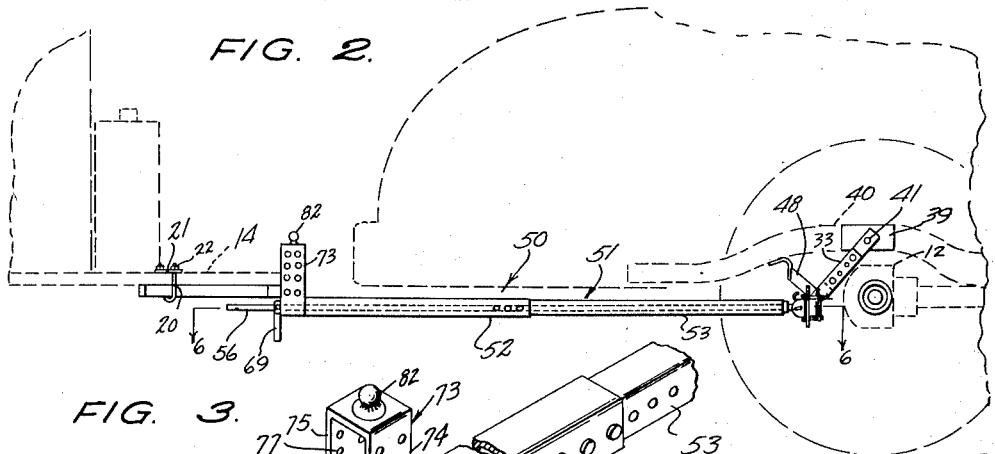
Figure 2 is a side elevational view of the trailer hitch shown in Figure 1.

Referring now with particularity to the drawings, wherein like reference numerals have been used throughout the several views to designate like parts, there is shown the trailer hitch of the present invention, generally designated by the reference numeral 10, which has one end attached to a vehicle chassis 11, illustrated in phantom, contiguous to the rear axle and differential assembly 12 thereof. The other end of the hitch 10 is connected to the forward end of a trailer body, which is illustrated in phantom and designated by the reference numeral 13.

Figure 3:
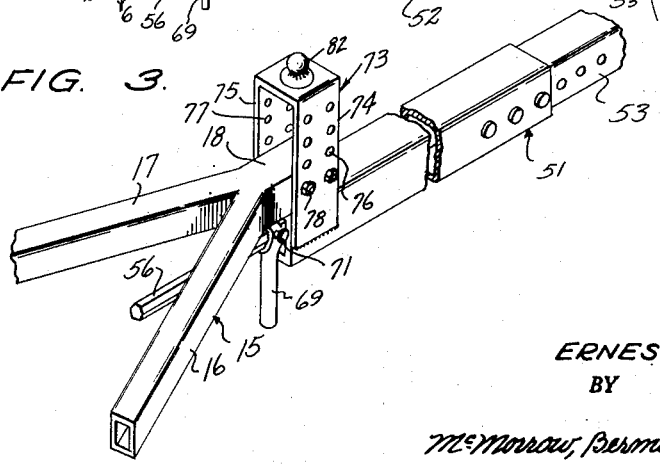
Figure 3 is an enlarged fragmentary perspective view of a portion of the trailer hitch of the present invention, with parts broken away and shown in section.

The trailer hitch includes a horizontally disposed Y-shaped trailer hitch bar 15 having the free ends of its divergent legs 16 and 17 underlying and fixedly secured to the V-shaped coupling bar 14 of the trailer body 13, and having its remaining leg 18 spaced forwardly of the trailer body 13 along the longitudinal center line of the latter. As clearly illustrated in Figure 3, the trailer hitch bar is fabricated of a square tubing having the requisite strength for the particular trailer to be hitched to the vehicle. The securement of the legs 16 and 17 of the trailer hitch 15 to the coupling bar 14 of the trailer body 13 is effected by means of the U-shaped brackets 20 which have their bights underlying the legs 16 and 17 of the trailer hitch bar and have their legs terminating at a point adjacent to and spaced above the coupling bar 14. The legs of the brackets are threaded and support a bearing plate 21, which is secured in place against the coupling bar 14 by means of the nuts 22.

A suitable support, designated generally by the reference numeral 30, Figure 4, is connected to the vehicle chassis 11 at a point directly above and spaced from the longitudinal center line of the rear axle and differential assembly 12. The support 30 embodies a channel-shaped supporting bar 31 which is horizontally disposed and supported in spaced, parallel relation rearwardly of and contiguous to the rear axle and differential assembly 12. The supporting bar 31 is carried by inclined supporting straps 32 and 33, each of which has one end fixedly secured to the adjacent end of the supporting bar 31, and has the other end provided with suitable means for effecting the securement of the supporting straps 32 and 33 to the vehicle chassis 11 at a point above the rear axle and differential assembly 12. The last-named means embodies a pair of spaced attachment plates 34 and 35 arranged on opposite sides of the adjacent longitudinal member 36 of the vehicle chassis 11 and secured thereto by means of a bolt 37 which traverses the assembly of the attachment plates 34 and 35, the longitudinal member 36 and the adjacent end of the supporting strap 32. Similarly, a pair of spaced attachment plates 38 and 39 are secured to the longitudinal member 40 by means of the transversely extending bolt 41.

Each of the supporting straps 32 and 33 is provided with suitable means for adjusting the overall length thereof. Since the structure of each of the supporting straps is the same, it will suffice to describe only one in detail. The supporting strap 32 embodies two sections 42 and 43 disposed with their innermost ends overlapping and abutting each other. The abutting and overlapping ends are provided with alignable longitudinally spaced apertures, generally designated by the reference numeral 44, each of the apertures being threaded for the extension therethrough of the bolts 45 and 46. To effect the adjustment or length of the strap 32, it is merely necessary to align any desired ones of the spaced apertures 44 and effect the securement of the sections 42 and 43 together by means of the bolts 45 and 46.

Carried by the supporting straps 32 and 33 are the brace bars 47 and 48 which are adapted to be connected to the longitudinal members 36 and 40 of the chassis 11 at a point spaced rearwardly of the point of securement of the supporting straps 32 and 33. The brace bars 47 and 48 cooperate with the supporting straps 32 and 33 to impart additional rigidity to the securement of the support 30 to the vehicle chassis 11.

Interposed between the trailer hitch bar 15 and the support 30 is a drawbar structure 50 which is detachably connected to the trailer hitch 15 and the support 30. The drawbar structure 50 includes a hollow drawbar 51 embodying a hollow, rectangular main section 52 and a hollow, rectangular extensible section 53 disposed in end-to-end relation with respect to the main section 52 and telescopically received and supported in the latter. As clearly shown in Figure 6, the main section 52 carries a plurality of threaded bolts 54 which are selectively engageable within longitudinally spaced, threaded apertures 55 provided in the extensible section 53 for detachably securing the sections together in a select position of adjustment with respect to each other.

Disposed within the sections of the hollow drawbar 51 is a multi-sided rod 56 which has one end thereof projecting exteriorly of the outer end of the extensible section 53 and has the other end thereof projecting exteriorly of the outer end of the main section 52. As clearly illustrated in Figures 5 and 6, the end portion of the rod 56 contiguous to the outer end of the extensible section 53 is formed with a bearing section 57 which rotatably journals the rod 56 for movement about an axis extending longitudinally of the hollow drawbar 51. Secured to or formed integrally with the bearing section 57 is a stop collar 58 which engages against the adjacent end of the extensible section 53. Secured to or formed integrally with the bearing section 57 of the rod 56 is a hitch head 59 which is in the form of a flat, circular disc.

Carried by the supporting bar 31 of the support 30 intermediate the ends thereof is a housing 60 which is provided with a socket 61 for embracingly engaging the hitch head 59. The housing includes a supporting plate 62 which is adjustably secured on a mounting plate 63. The mounting plate 63 is bolted in position by means of the backing plate 64 and the bolt 65 which straddle the supporting bar and engage the mounting plate. The supporting plate of the housing 60 is secured to the mounting plate 63 by means of the bolts 66 which are selectively receivable in the longitudinally spaced apertures 67 of the mounting plate 63. Accordingly, the housing 60 can be vertically adjusted with respect to the supporting bar 31. As clearly illustrated in Figures 5 and 6, the housing 60 includes a horizontally disposed, arcuate slot 68 which communicates with the socket 61 and is adapted to receive the hitch head 59 when the latter is in a substantially horizontally disposed position. Accordingly, the hitch head 59 can be inserted into the socket 61 of the housing 60 when in the horizontal position and rotated to a substantially vertical position, wherein the hitch head 59 is maintained against displacement from within the housing.

Disposed transversely of the end of the rod 56 projecting from the main section 52 of the hollow drawbar 51 is an actuating lever 69 which includes a head 70 circumposed about the rod 56. The lever 69 is secured in a select position of its adjustment along the rod by means of the set screw 71 which extends through the head 70 and engages the multi-sided rod 56. As illustrated in Figs. 5 and 6, the lever 69 is arranged contiguous to the end of the main section 52 and cooperates with the stop collar 58 to maintain the rod 56 against endwise movement within the hollow drawbar 51.

Carried by the outer end of the main section 52 of the hollow drawbar 51 is an upstanding inverted U-shaped bracket 73 which has the legs 74 and 75 thereof secured to the hollow drawbar 51. The legs 74 and 75 are provided with opposed rows of apertures, designated generally by the reference numerals 76 and 77, for the extension therethrough of bolts 78. The bolts 78 are receivable within suitable bores provided in the leg 18 of the trailer hitch bar 15, and accordingly facilitate the attachment of the trailer hitch bar 15 to the hollow drawbar 51. In this manner, the trailer body 13 can be supported in any desired level position and secured to the hollow drawbar 51.

Carried by the extensible section 52 of the hollow drawbar 51 are a plurality of safety chains 79 which selectively engage chain hooks 80 carried by the housing 60 for detachably securing the extensible section 53 of the hollow drawbar 51 to the housing. As clearly illustrated in Figure 6, the safety chains 79 are supported on spaced chain hooks 81 carried by the extensible section 53.

An auxiliary method of attaching the coupling bar 14 of the trailer body 13 is provided by securing a ball 82 to the bight of the U-shaped bracket 73, the ball cooperating with a socket, not shown, formed on the coupling bar 14 to attach the trailer body to the hitch bar.

In actual use, to effect the securement of the trailer hitch of the present invention to the vehicle chassis, it is merely necessary to provide a pair of bolt-receiving apertures in the longitudinal members 36 and 40 of the vehicle chassis 11 at a point adjacent to and spaced above the longitudinal center line of the rear axle and differential 12 of the vehicle. The supporting bar 31 can then be selectively positioned with respect to the rear axle and differential assembly 12 by means of the adjustable straps 32 and 33. The securement of the adjacent end of the hollow draw bar 51 to the support 30 can be effected by means of the ball-and-socket joint provided by the hitch head 59 and the housing 60 provided with the socket 61. To couple the hitch head 59 with the housing 60, it is merely necessary to manually grasp the lever 69 and rotate the hitch head 59 from the horizontally disposed unlocking position of Figure 6 into the substantially vertically disposed locking position of Figure 5. The securement of the other end of the hollow draw bar 51 to the trailer hitch bar 15 is effected by means of the bolts 78 which straddle the trailer hitch bar 15 and are supported on the upstanding bracket 73.

From the foregoing it is readily apparent that the trailer hitch of the present invention places the rearwardly and downwardly directed pull exerted on the vehicle due to the weight of the trailer on the vehicle chassis and effectively on the rear springs of the vehicle instead of the bumper thereof. In this manner objectionable modifications of the body of the vehicle are eliminated, and the rear bumper, easily employed to effect the securement of the trailer hitch bar to the vehicle, is in no way damaged.

Although only one embodiment of the trailer hitch of the present invention has been described, it is readily apparent that numerous modifications can be made without departing from the spirit of the invention as set forth in the appended claims.

What is claimed is:

1. A trailer hitch comprising a hollow drawbar, an upstanding inverted U-shaped bracket arranged exteriorly of said bar adjacent one end of said bar and carried by the latter, a hitch bar arranged longitudinally of said drawbar and having one end extending slidably between the legs of said bracket, fastening means extending transversely through the legs of said bracket and said one end of said hitch bar and attaching said hitch bar to said bracket, securing means on said hitch bar adjacent the other end thereof and engageable with a coupling bar of a trailer body for attaching said hitch bar to the trailer body, a horizontally disposed supporting bar arranged transversely of said drawbar adjacent the other end of the latter, a strap means on each of the ends of said supporting bar adapted to be dependingly secured to a longitudinal member of the vehicle chassis, a housing facing the other end of said drawbar and secured to said supporting bar intermediate the ends of the latter, there being a horizontally disposed slot in the facing portion of said housing, a rod extending longitudinally of and within said drawbar and supported in said drawbar for rotary movement and having one end projecting beyond the other end of said drawbar and having the other end projecting beyond said one end of said drawbar, a flat head on said projecting end of said rod and insertable in the slot of said housing, and a lever on said projecting other end of said rod for effecting the rotary movement of said rod.

2. A trailer hitch comprising a hollow drawbar, an upstanding inverted U-shaped bracket arranged exteriorly of said bar adjacent one end of said bar and carried by the latter, a hitch bar arranged longitudinally of said drawbar and having one end extending slidably between the legs of said bracket, fastening means extending transversely through the legs of said bracket and said one end of said hitch bar and attaching said hitch bar to said bracket, securing means on said hitch bar adjacent the other end thereof and engageable with a coupling bar of a trailer body for attaching said hitch bar to the trailer body, a horizontally disposed supporting bar arranged transversely of said drawbar adjacent the other end of the latter, a strap means on each of the ends of said supporting bar adapted to be dependingly secured to a longitudinal member of a vehicle chassis, a housing facing the other end of said drawbar and secured to said supporting bar intermediate the ends of the latter, there being a horizontally disposed slot in the facing portion of said housing, a rod extending longitudinally of and within said drawbar and supported in said drawbar for rotary movement and having one end projecting beyond the other end of said drawbar and having the other end projecting beyond said one end of said drawbar, a flat head on said projecting one end of said rod and insertable in the slot of said housing, a lever on said projecting other end of said rod for effecting the rotary movement of said rod, and a brace means projecting from each of the ends of said supporting bar and adapted to be dependingly secured to a longitudinal member of a vehicle chassis.

ERNEST A. COOK.

References Cited in the file of this patent

UNITED STATES PATENTS

| Number | Name | Date |
|---|---|---|
| 1,473,563 | Julson | Nov. 6, 1923 |
| 1,494,268 | Mendenhall | May 13, 1924 |
| 2,142,749 | Graves | Jan. 3, 1939 |
| 2,238,095 | Almcrantz | Apr. 15, 1941 |
| 2,252,135 | Oyler | Aug. 12, 1941 |
| 2,320,046 | Notar | May 25, 1943 |